April 23, 1929.  J. A. RICKETTS  1,709,952
REEL ATTACHMENT FOR FISH RODS
Filed Aug. 16, 1927   3 Sheets-Sheet 1
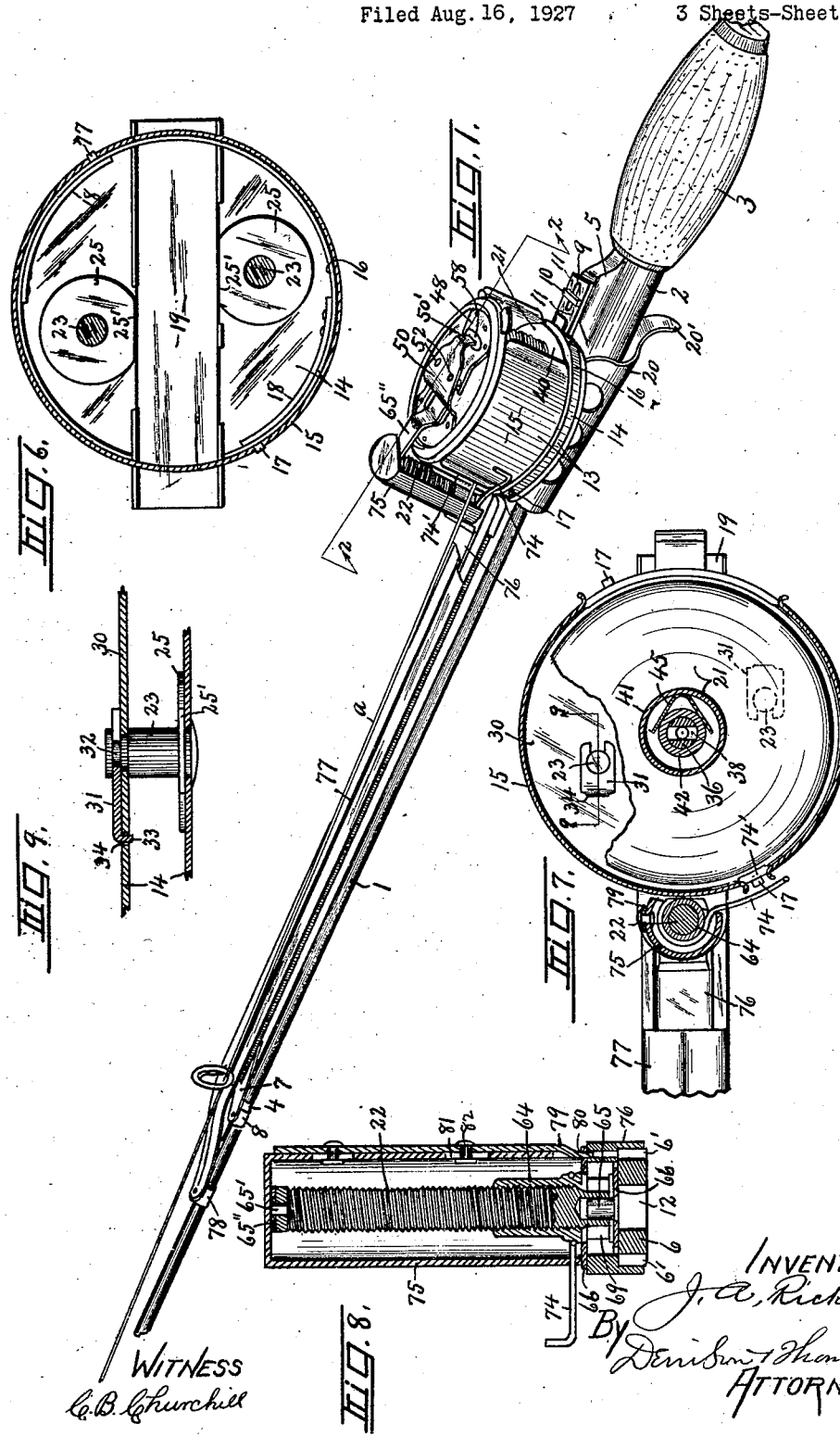

April 23, 1929.　　　J. A. RICKETTS　　　1,709,952
REEL ATTACHMENT FOR FISH RODS
Filed Aug. 16, 1927　　　3 Sheets-Sheet 2
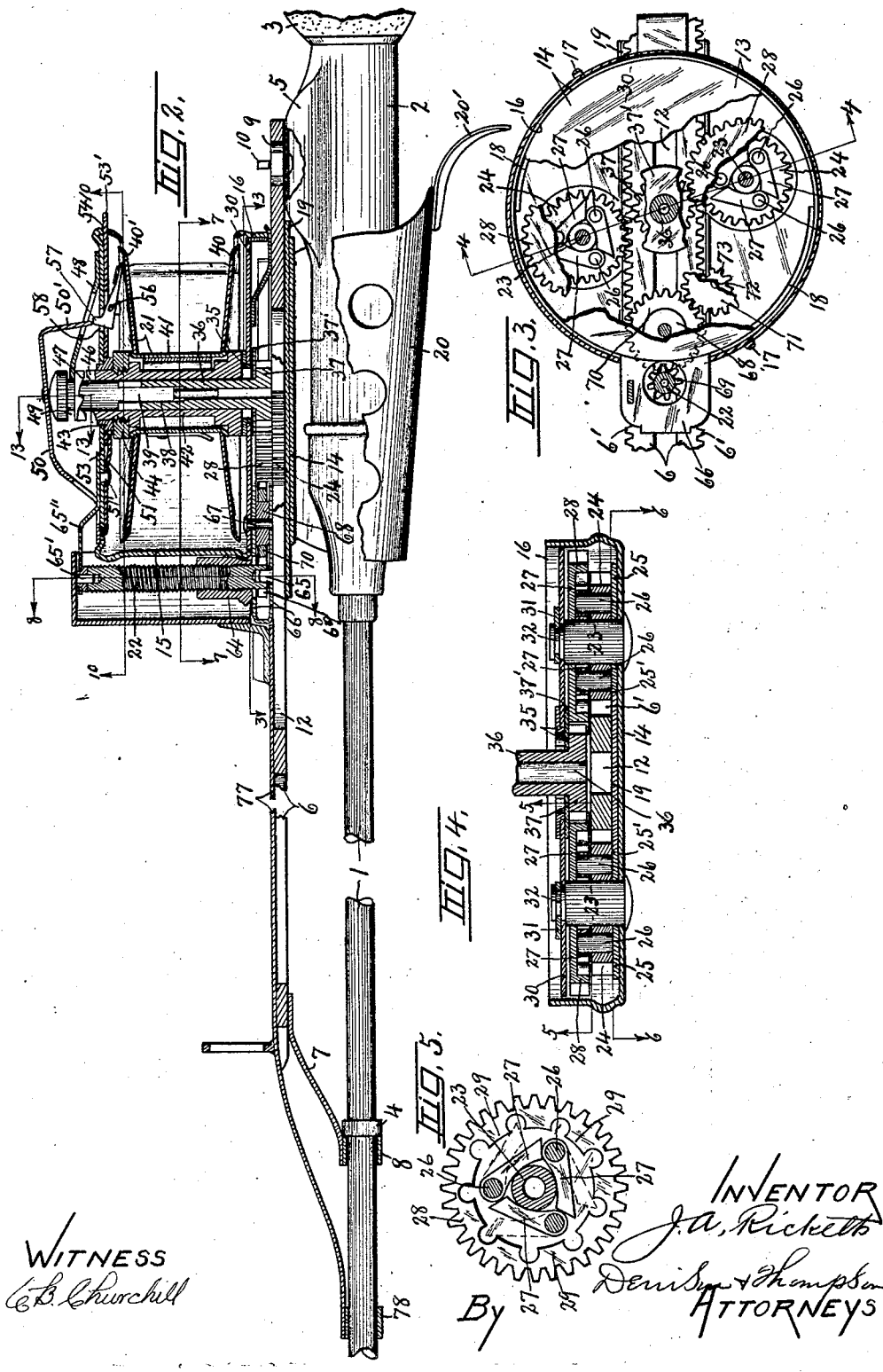

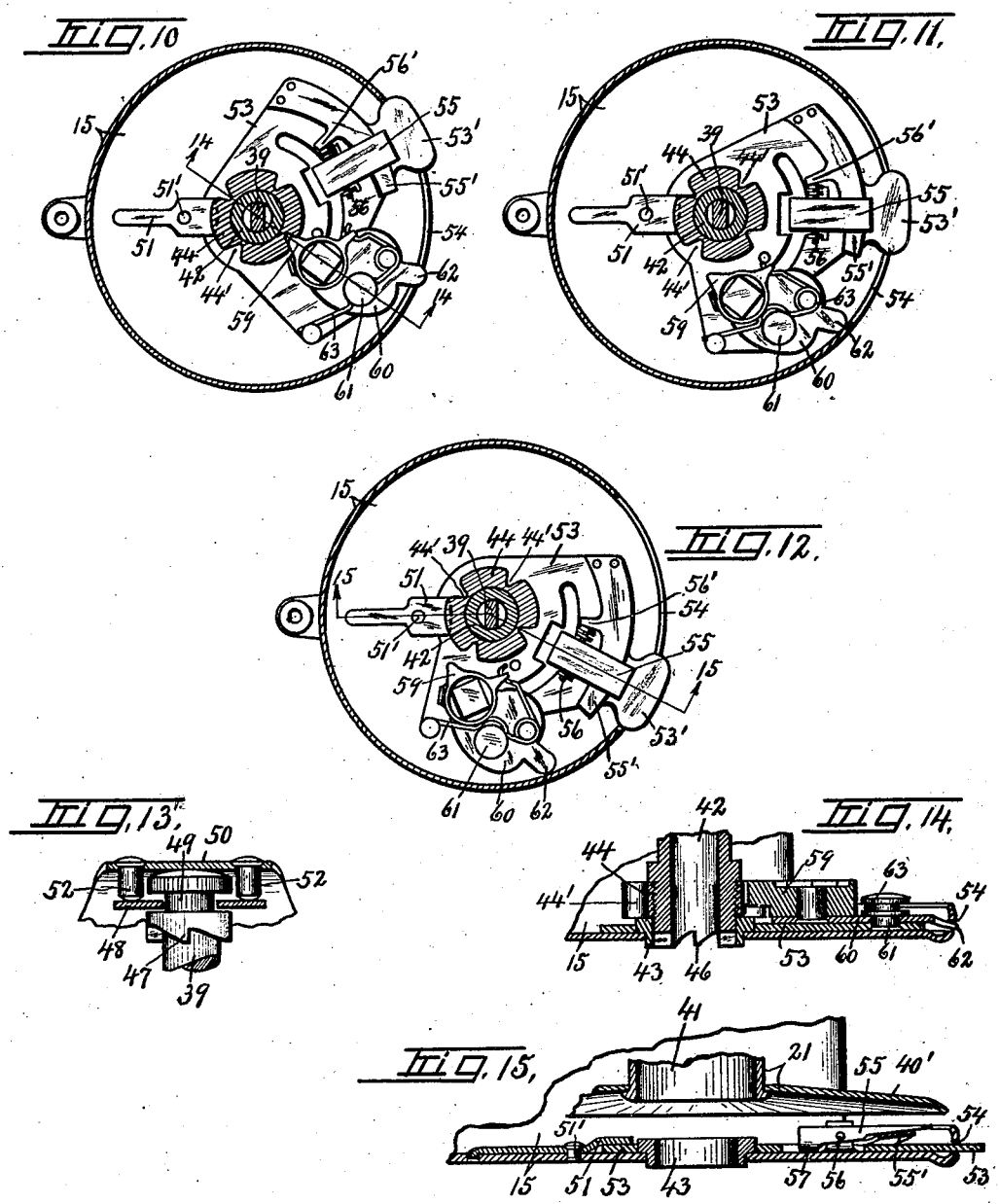

Patented Apr. 23, 1929.

1,709,952

UNITED STATES PATENT OFFICE.

JOHN ASA RICKETTS, OF ROCHESTER, NEW YORK.

REEL ATTACHMENT FOR FISH RODS.

Application filed August 16, 1927. Serial No. 213,306.

This invention relates to a line reel attachment for fish rods of the class set forth in my Patents No. 1,038,203, September 10, 1912, and No. 1,046,647, December 10, 1912, in that it involves the use of a reel-supporting case movable along the rod and means for rotating the reel in one and the same direction during the reverse movements of the reel-supporting case together with suitable means for laying the line in orderly manner upon the reel from end to end thereof.

Aside from the main object of rotating the reel in one and the same direction by reciprocal movement of its supporting case along and upon the rod and simultaneous laying of the line upon the reel, the specific object of the present invention is to simplify the construction and assembly of the various parts of the attachment so that they may be assembled with greater ease and economy to give more efficient and reliable service than has heretofore been practised.

In other words, I have sought to assemble the various parts of the attachment without screws or equivalent fastening means and at same time to enable them to be quickly detached from each other by relatively simple movements of certain retaining parts.

Another object is to provide the reel-supporting case with a detachable guard or shield for the toothed rack and line-laying screw to protect those parts against contact with external objects and particularly to avoid the fouling of the line therewith.

Other objects and uses relating to specific parts of the attachment will be brought out in the following description.

In the drawings:—

Figure 1 is a perspective view of a fish rod and my improved line-reeling attachment in operative position thereon.

Figure 2 is an enlarged longitudinal vertical sectional view taken in the plane of line 2—2, Figure 1.

Figure 3 is a horizontal sectional view taken in the plane of line 3—3, Figure 2.

Figure 4 is an enlarged detail sectional view taken in the plane of line 4—4, Figure 3.

Figures 5 and 6 are detail sectional views taken respectively in the planes of lines 5—5 and 6—6, Figure 4.

Figures 7 and 8 are detail sectional views taken respectively in the plane of line 7—7 and 8—8, Figure 2, Figure 8 being enlarged.

Figure 9 is an enlarged detail sectional view taken in the plane of line 9—9 Figure 7.

Figures 10, 11 and 12 are detail sectional views, inverted, taken in the plane of line 10—10, Figure 2, showing the brake-controlling lever in different positions of adjustment, Figure 10 showing the click-operating position, Figure 11 the brake-operating position and Figure 12 the free reel or release position.

Figure 13 is an enlarged detail sectional view taken in the plane of line 13—13, Figure 2.

Figures 14 and 15 are detail sectional views taken respectively in the planes of lines 14—14, Figure 10 and 15—15, Figure 12, except that they are inverted.

In order that the invention may be clearly understood I have shown a fish rod —1— as provided at one end with a ferrule —2— for receiving and supporting a suitable handle —3—, the rod —1— and ferrule —2— being provided respectively with a collar —4— and a boss —5— for purposes hereinafter described.

A toothed rack —6— is mounted upon the rod to extend some distance beyond the front end of the ferrule —2— in parallel spaced relation to the rod —1— and has its forward end provided with a downwardly and forwardly extending arm —7— terminating in a sleeve —8— which loosely surrounds the adjacent portion of the rod —1— and is normally engaged with the front end of the collar —4— to assist in holding the rack —6— against rearward movement but permitting its free forward movement when detached from the boss —5—.

The rear end of the rack —6— is detachably connected to the boss —5— by means of a slot —9— and pin —10— connection, the slot —9— being formed in the adjacent end of the rack while the pin —10— is pivotally mounted upon the top wall of the boss —5— and is provided with a T-shaped head which, when turned crosswise of the slot, serves to lock the adjacent portion of the rack to the boss —5— but, when turned lengthwise of the slot, permits the rack to be lifted away from the boss and together with its sleeve at —8— moved rearwardly until the sleeve passes off from the front end of the rod thus permitting the removal of the rack and parts carried thereby from the rod when desired or by a reversal of said movement reattached to the rod.

The rack —6— is provided along its opposite longitudinal edges with parallel rows of teeth —6'— extending the major portion of the length thereof from the connecting pin —10— to the connecting arm —7— as shown in Figures 2 and 3, the rear end of the rack being additionally held against forward and rearward movement by pins —11— on the adjacent face of the ferrule —2— adapted to engage in corresponding apertures in the contiguous portion of the rack as shown in Figure 1.

The rack —6— is also provided with central lengthwise slots —12—, Figure 3, extending lengthwise thereof at suitable intervals for lightening the weight of the rack.

A reel case —13— is reciprocally slidable along and upon the rack —6— and comprises a cup-shaped base section —14— and an inverted cup-shaped cap section or housing —15—, the base section —14— being provided with an upturned annular flange —16— around and upon which the lower end of the cylindrical cap section —15— is adapted to be removably mounted and is normally held in operative position thereon by suitable pins —17— which are mounted upon the ends of a corresponding number of springs —18— to move radially in registering openings in the adjacent portions of the flange —16— and cap section —15— against the action of the springs —18—, the latter being tensioned to normally hold the pins —17— in their respective apertures when the sections —15— and —16— are assembled, but it is evident that when these locking pins —17— are pushed inwardly so as to clear the adjacent portions of the cap section —15—, the latter may be readily lifted axially out of engagement with the section —14—, see Figure 6.

The base section —14— is provided with a diametrically extending guide-opening therethrough near the bottom thereof for receiving the rack —6— and a longitudinally extending guide plate —19— which rests upon and is secured to the upper face of the bottom of the section —14— to extend beyond the front and rear thereof, the extensions being provided with up-turned guide flanges of approximately the same height as the thickness of the rack —6— to assist in guiding the reel-supporting case in its reciprocal movement along and upon the rack.

The gear case is reciprocated by hand along and upon the rack —6— and for this purpose is provided with a U-shaped sheet metal handle —20— looped around the underside of the rod —1— and its ferrule —2— and its opposite longitudinal edges flanged outwardly and brazed or otherwise secured to the underside of the bottom of the base section —14— to form a unitary part thereof, said handle being provided at its rear end with a downwardly projecting finger piece —20'— to facilitate the reciprocal operation of the reel-case along the rack.

Reel-operating mechanism.

The base section —14— constitutes a gear housing for receiving suitable gearing by which rotary motion is transmitted from the rack —6— to a line reel —21— and to the operating screw as —22— of the line-laying device hereinafter more fully described.

For these purposes a pair of upright studs or journal bearings —23— are riveted or otherwise rigidly secured at their lower ends to the bottom of the base section —14— to extend upwardly therefrom approximately the height of the base section at diametrically opposite sides of the rack and equal distances therefrom for receiving and supporting a pair of gears —24— which are journaled thereon and engage the teeth on adjacent sides of the rack —6— so that when the reel case is reciprocally moved along the rack the gears —24— will be rotated in reverse directions A pair of disks —25—, of substantially the same thickness as the wear plate, are secured by spot welding or otherwise to the upper surfaces of the bottom of the case section —14— around and co-axial with the studs —23— to reinforce the adjacent portions of said bottom and to assist in holding the studs against rotation, the inner sides of said disks being flattened at —25'— to engage the adjacent edges of the plate —19— to further hold the studs against turning movement.

The thickness of the gears —24— is substantially the same as the thickness of the toothed rack —6— and are each provided with a plurality of, in this instance three, upwardly projecting posts —26— of uniform height and arranged in uniformly spaced relation circumferentially for receiving a corresponding number of pawls —27— which are pivoted at one end thereto to permit their other ends to swing outwardly by centrifugal force when the gears —24— are rotated.

An additional pair of gears —28— are journaled upon the upper ends of the studs —23— directly over the gears —24— and are provided in their undersides with recesses for receiving the corresponding sets of pawls —27— and also to form a flange surrounding the outer or free ends of the pawls.

The flange of each gear —28— is provided with internal teeth —29— forming what may be termed an internal ratchet adapted to be engaged by the free ends of the corresponding pawls —27— when the latter are thrown outwardly by centrifugal force for imparting rotary motion to the gears —28— as the reel case is reciprocated along the rack —6—.

The pawls —27— of each of the gears —24— are arranged to rotate the corresponding gear —28— when the reel case is moved along the rack in one direction during which time the pawls of the other gear will simply trail against the teeth of the corresponding gear —28—; but, on the other hand, when the direction of movement of the reel case is reversed the pawls of the second-named gear —24— will be brought into engagement with the teeth of the corresponding gear —28— while the pawls of the first-named gear —24— will trail against the internal teeth —29— of the adjacent gear —28—, thus causing the reel to rotate in the same direction as the reel case is moved in reverse directions along the rack.

A cover plate —30— is removably mounted upon the upper ends of the posts —23— within the upper end of the base section —14— in a plane just above the upper faces of the gear disks —28— and in slightly spaced relation thereto and is held in operative position by detents —31—, one for each stud —23—, each detent having one end bifurcated and normally engaged in an annular groove —32— in the upper end of the corresponding stud —23— and its other end flanged at —33— and engaged in an aperture —34— in the plate —30—.

These detents —31— are preferably made of spring metal and of sufficient length so that when it is desired to remove the cover plate —30— the flanged end —33— of the detents may be sprung out of their respective openings —34— and the detents then withdrawn radially from engagement in the corresponding annular grooves —32—, see Figures 4, 7, and 9.

The plate —30— is provided with a central hub —35— in which is journaled an upright shaft section —36— having its lower end provided with a gear —37— meshing with the external teeth of both of the gear disks —28— as shown in Figures 3 and 4 whereby the shaft section —36— will be rotated in one and the same direction as the reel case is moved in opposite directions along the rack —6—.

The upper end of the shaft section —36— is provided with a diametrically extending slot —38— for receiving the lower reduced and flattened end of a co-axial shaft section —39— to form a spline connection therewith and to permit the upper shaft section to move vertically relatively to the lower shaft section —36—.

The reel —21— comprises lower and upper flanges —40— and —40'— in vertically spaced co-axial relation connected by a tubular hub —41— upon and from which the line —a— is adapted to be wound and unwound.

A tubular sleeve —42— is journaled upon the shaft section —36— to extend through and beyond the opposite ends of the hub —41— and has its lower end enlarged and seated upon the upper face of the hub —35— and its upper end journaled in a bushing —43— in the top wall of the cylindrical reel case section —15—.

The portion of the tubular sleeve —42— between the upper end of the hub —41— and bushing —43— is threaded and engaged by a nut —44— which also engages the upper end of the hub —41— to cooperate with the lower enlarged end of the sleeve for holding the reel and sleeve against relative axial movement and at the same time permitting relative rotation of those parts under certain conditions.

These conditions are that the hub —41— is provided with a V-shaped member —45— Fig. 7 of spring metal having its apex rigidly secured to the inner surface of the hub —41— between the enlarged ends thereof and its opposite arms frictionally engaged by their own spring tension with the periphery of the tubular sleeve —42— for establishing a friction drive connection between said sleeve and the reel and thus permit relative rotation of the reel in case of excessive pull upon the line when the tubular sleeve —42— is operatively driven by the rotation of the shaft sections —36— and —39— as the reel-supporting case is moved along the rack —6—.

The upper end of the tubular sleeve —42— above the top wall of the cylindrical case section —15— is provided with a clutch face —46— adapted to be engaged by a companion clutch face —47— on the upper end of the shaft section —39— as the latter is depressed by hand against the action of a retracting spring —48— in a manner presently to be described.

The spring —48— is secured at one end to the top of the case section —15— some distance to the rear of the axis thereof and has its rear end engaged in an annular groove —49— in the upper end of the shaft section —39— just above the cam —47— for yieldingly holding the cam —47— out of engagement with its companion cam —46— and allowing the reel to remain at rest even though the shaft sections —36— and —39— may be rotated by the reciprocal movements of the reel case along the rack —6—.

The cam —47— and adjacent end of the spring arm —48— are adapted to be simultaneously depressed to establish driving connection between the shaft section —39— and tubular sleeve —42— by means of an operating member —50— of spring metal extending across and upon the upper rounded end face or head of the shaft section —39— and having its rear end riveted or otherwise secured to the top wall of the case section —15— and its front end provided with a downwardly extending offset —50'— projecting through an opening in the spring —48— for controlling the operation of a brake member, presently to be described, the member —50— being provided with bearing pins —52— for engaging the opposite arms of the adjacent bifurcated end of the spring —48— at opposite sides of the shaft section —39— as shown more clearly in Figure 13, it being understood that the spring arm —50— will be self-retracting or at least adapted to yield under the upward pressure of the free end of the spring —48— when hand pressure on the member —50— is released.

Reel brake, click and release.

A metal plate —53—, Figures 10 to 12 inclusive, is loosely journaled upon the periphery of the inner end of the bushing —43— to extend rearwardly through a circumferentially elongated slot —54— in the rear peripheral wall of the adjacent portion of the case section —15— and is disposed in a plane directly adjacent the inner face of the top wall of said case section and is held against undue inward movement by a detent —51— which is pivoted to the inner face of the top wall of the section —15— at the rear of the bushing at 51 as shown more clearly in Figs. 2 and 15.

The outer end of this plate —53— is reduced in circumferential length and projected beyond the periphery of the case section —15— to form a handle —53'— by which the plate may be adjusted at will to different positions as, for example, an intermediate braking position, as shown in Fig. 11, a brake-releasing position, as shown in Fig. 12, and a click position, as shown in Figure 10.

A brake lever —55— is pivoted intermediate its ends at —56— to suitable lugs on the plate —53— to extend forwardly and rearwardly from its pivot and when the plate is adjusted to its braking position the front end of said brake lever is spring-pressed into frictional engagement with the upper surface of the upper flange —40'— of the reel to retard the rotation of the latter by the spring —55'—.

The rear end of the brake lever —55— is provided with a transversely rounded lug —57— projecting through an opening —58— in the top wall of the case section —15— directly in the path of the lower end of the downward extension —50'— of the clutch operating member —50— so that when said operating member is operated to engage the clutch member —47— with the clutch member —46— for rotating the reel as the case is moved back and forth along the rack —6—, and the plate —53— is in its brake-operating position the brake lever —55— will be released from its braking position to permit free rotation of the reel but as soon as the pressure upon the member —50— is released the operating spring as —55'— for the brake lever will restore said brake lever to its braking position.

The opening —58— in the top wall of the case section —15— is only slightly greater than the corresponding width of the projection —57— on the brake lever so that the latter will be registered with said opening only when the plate —53— is adjusted to its intermediate or braking position as shown in Figure 11.

On the other hand, when the plate —53— is adjusted to either of the positions shown in Figures 10 or 12 the rounded upper face of the projection —57— will ride against the underside of the top plate of the case section —15— to effect a release of the brake lever from its braking position against the action of its operating spring —55'— as shown in inverted Figure 15.

The plate —53— is removably mounted upon the underside of the top of the case section —15— independently of the reel —21— and is held against downward displacement from its bearing —43— by the detent —51— which is pivoted at —51'— to the top of the case section —15— to move into and out of engagement with the underside of the adjacent portion of the plate and when displaced from its holding position permits the plate —53— to be removed from the bushing —43— after the case section —15— has been removed from the base section —14— and the reel —21— withdrawn from the interior of the case section —15—.

The nut —44— on the upper end of the reel-supporting sleeve —42— is provided with peripheral notches —44'— arranged in uniformly spaced relation circumferentially thereby forming intervening teeth as a part of the clicking mechanism for successive engagement with a pawl —59— which is pivotally mounted upon a supplemental plate —60— carried by the plate —53—.

The supplemental plate —60— is pivoted at —61— to the plate —53— some distance to the rear side of the nut —44— and is provided with a reduced extension —62— projecting through the slot —54— in the case section —15— and rounded at its outer end to ride against the said case section —15— and thereby to withdraw the pawl —59— from operative engagement with the periphery of the nut —44— against the action of its operating spring —63— when the plate —53— is adjusted to either of the positions shown in Figures 11 and 12.

The pawl —59— is pivoted to the inner end of the supplemental plate —60— to move into and out of engagement with the notches —44'— of the nut —44— under the action of the spring —63— which is operatively connected to the pawl and to the plate —53— as shown in Figures 10, 11, and 12.

The slot —54— in the case section —15— extends circumferentially substantially equal distances from a medial line extending rearwardly from the axis of the reel to allow the plate —53— to be adjusted angularly to the three positions shown in Figures 10, 11 and 12, the end walls of the slot forming stops for limiting the movement of the plate —53— in opposite directions from its braking position.

The circumferential distance between the handle —53'— of the plate —53— and the projection —62— of the supplemental plate —60— is less than the circumferential length of the slot —54— but greater than half the length of said slot so that when the plate —53— is adjusted to its braking position shown in Figure 11 the projection —62— will have been brought into engagement with the inner peripheral wall of the case section —15— at one end of the slot for tripping the pawl —59— out of engagement with the periphery of the nut —44—, this tripping position of the pawl being maintained as the plate —53— is adjusted to the brake-releasing position shown in Figure 12.

On the other hand, when the plate —53— is adjusted in the opposite direction from its medial braking position the projection —62— will be released from engagement with the inner periphery of the case section —15— to enter the slot —54— and thus permit the pawl —59— to be forced into engagement with the periphery of the nut —44— by the spring —63— as shown in Figure 10 at which time the brake member —55— will have been forced from its braking position against the action of the spring —55'— to permit free rotation of the reel by the drawing out of the line to produce the desired clicking signal.

The angular adjustment plate —53— from its medial position shown in Figure 11 to the position shown in Figure 12 will automatically release the brake member —55— from its braking position and at the same time release the pawl —59— from engagement with the periphery of the nut —44— thus allowing free rotation of the reel unrestrained by either the brake —55— or pawl —59—.

*Line-laying.*

The line-laying device comprises the upright screw —22— and a nut —64—, the lower end of the screw being journaled on an end-thrust bearing stud —65— on the lower arm of a U-shaped brake —66— which is secured by rivets —67— or equivalent fastening means to the underside of the cover plate —30— of the base section —14— as shown more clearly in Figure 2.

A spacing member —68— is interposed between the lower and upper arms of the bracket —66— to assist in holding them in fixed relation particularly at the points of securement by the rivets —67—.

The lower end of the screw —22— is provided with a pinion —69— meshing with a gear —70— which is journaled upon the periphery of the spacing member —68— and engages an idler gear —71—, said gears —69—, —70— and —71— being disposed in a plane between the lower and upper arms of the bracket —66— to form a part of the mechanism for transmitting rotary motion from one side of the toothed rack —6— to the screw —22—.

The gear —71— is mounted upon an upright shaft —72— carrying at its lower end a pinion —73— which meshes with the teeth of one side of the rack —6— as shown in Figure 3 whereby relative reciprocal movement of the rack and reel-case lengthwise of the rack will cause the screw —22— to be rotated in reverse direction and thereby effect a vertical reciprocatory movement of the nut —64—.

The rear side of the nut —64— is flattened to ride against the adjacent portion of the periphery of the case section —15— to hold the nut against turning, said nut being also provided with a laterally and forwardly extending line-engaging arm —74— rigid therewith and extending across a vertical guide opening —74'— in the peripheral wall of the case section —15— to move lengthwise thereof as the nut is raised and lowered for properly laying the line along the reel as it is wound upon said reel.

The upper arm of the bracket —66— is provided with an opening of sufficient diameter to permit the pinion —69— to pass therethrough and thereby to facilitate the assembling of the screw in operative position and permitting it to be readily removed when desired without disturbing the other parts of the screw-operating mechanism.

The upper end of the screw is journaled on a stud bearing —65'— which is mounted upon the front end of a spring arm —65''— having its other end riveted or otherwise secured to the top wall of the case section —15— as shown more clearly in Figure 2 for holding the screw in operative position.

The screw —22— and nut —64— are inclosed in a suitable housing —75— which is mounted upon the bracket —66— to extend upwardly therefrom at the front of the case section —15— and is open at its rear side to permit the vertical movement of the line-laying arm —74—.

The lower end of the housing —75— is provided with a forwardly extending foot —76— having down-turned lengthwise flanges adapted to ride upon the upper face of the rack —6— and along the opposite open sides of the bracket —66— to close the open space between the lower and upper arms of the bracket, said housing being provided with a horizontal slot extending forwardly from its rear side to receive the opposite lengthwise edges of the top wall of the bracket and thus permit the housing —75— to be brought close to the adjacent side of the case section —15—.

A guard or shield plate —77— is slidably mounted upon the upper side of the rack —6— to extend the major portion of the length thereof and has its opposite lengthwise edges provided with down-turned flanges extending along the adjacent teeth of the rack to protect the latter against contact with external objects and particularly to prevent the line from fouling with the teeth of the rack.

The rear end of the guard plate —77— is rigidly secured to the foot —76— of the housing —75— to move therewith lengthwise of the rack as the reel case is reciprocated along said rack, the front end of the guard —77— being extended beyond the corresponding end of the rack and provided with a ferrule —78— surrounding the adjacent portion of the rod —1— for sliding movement thereon and serving to hold this end of the guard in operative position.

The housing —75— is detachably mounted upon the bracket —66— but is normally held in operative engagement therewith by a locking bolt —79— which is slidably mounted vertically along and upon the periphery of the housing —75— and has its lower end movable into and out of an opening —80— in the top wall of the bracket —66— as shown more clearly in Figure 8 for locking and releasing the housing upon and from the bracket, said locking member —79— being held in operative position by slot and pin connections —81— and —82— without interfering with its sliding movement.

Operation.

When the parts are assembled in the manner described the reciprocal movement of the rod and rack endwise relatively to the reel case or a corresponding reciprocal movement of the reel along the rack will cause the shaft sections —36— and —39— to be rotated in one and the same direction and downward pressure upon the operating member —50— will cause the clutch section —47— to engage its companion clutch section —46— for imparting similar rotary movement to the reel —21— for winding the line —a— thereon.

If the plate —53— has been previously adjusted to its medial position, Figure 11, to set the brake member —55—, this depression of the operating member —50— will also release the brake but the reel will be locked against rotation unless its case or rack are relatively moved endwise and except as the reel might be rotated by a pull upon the line against the resistance of the spring of the friction drive member —45—, Figure 7, it being understood that the release of the operating member —50— will allow free rotation of the reel around its driving shaft sections —36— and —39—.

If the plate —53— is shifted to the position shown in Figure 10 and the operating member —50— is still released the pawl —59— will be in engagement with the nut —44— so that the rotation of the reel by drawing out the line will cause an audible clicking signal to indicate this outward pull as may be caused by a fish on the line.

The shifting of the plate —53— to the position shown in Figure 12 and the operating member —50— still released will allow the reel to operate freely by the drawing out of the line.

It will be noted, however, that the rotation of the reel by the relative endwise reciprocation of the reel case and rack for winding the line on the reel is dependent in all positions of adjustment of the plate —53— upon the depression of the operating member —50— for engaging the clutch sections —46— and —47—.

The rear side of the reel case is preferably open to permit access to the line wound thereon, if desired.

In assembling the parts, the base section —14— of the reel case with the gears therein is slipped over the rear end of the rack —6— and moved forwardly thereon to engage its gears —24— with the teeth of the rack after which the loop —8— on the front end of the rack may be placed over and upon the front end of the rod —1— and the rack then drawn rearwardly and its rear end locked upon the lug —5— by the turning of the locking pin —10— crosswise of the slot —9—.

The case section —15— may then be pressed telescopically over and upon the base section —14— and locked in place by the spring actuated pins —17— thereby bringing the gear —37— on the lower end of the shaft section —36— into engagement with the gears —28— which are connected to their respective gears —24—.

The ferrule —78— on the front end of the shield plate —77— is then placed over and upon the front end of the rod after which the shield plate —77— with the screw housing —75— thereon is drawn rearwardly with its rear end in telescopic engagement with the bracket —66— whereupon the locking member —79— will be depressed by hand into engagement with the opening —80— in the top wall of the bracket —66— to lock said housing and shield in operative position, it being understood that prior to this latter operation the screw —22— will have been placed in operative position upon its journal bearing —65— and —65'— for connecting its pinion —69— to the driving gears in the base section —14—, the rod and reel being then ready for use.

A disk —37'— is secured to the shaft section —36— to rest upon the upper end faces of the gears —28— for preventing downward displacement of said shaft section and its gear —37— when the reel case —15— is removed from the rear end of the previously displaced rack —6—.

It will also be noted that the various parts of the attachment are readily assembled and disassembled without screws and without the use of tools which is a great advantage particularly when it is necessary to lubricate, clean or repair the various moving parts.

For example, the plate —53— carrying the brake, click and release mechanism is made as a single unit and loosely mounted upon the underside of the top of the case where it is held in place by the movable detent —51— and may be removed by shifting the detent by hand about its pivot —51'—.

The shield —77— and screw housing —75— are detachably held in place on the reel case by a single manually operated locking member —79— which when withdrawn permits the parts —77— and —75— to be detached from the reel case after which the spring arm —65''— may be sprung upwardly out of engagement with the upper end of the screw —22— to allow the latter with a nut —64— thereon to be lifted out of engagement with its lower end thrust bearing —65—.

The rack —6— is easily and quickly detached by simply turning the T-pin —10— lengthwise of its slot —9—.

The removal of the cover plate —30— of the base section —14— of the reel case by springing the latches —31— out of their respective holes —34— and then withdrawing them endwise permits the gears —28— to be lifted from their respective studs —23— and also permits the pawls —27— to be withdrawn upwardly from their respective pins —26—.

When the case section —15— is removed from its base section —14— by the inward depression of the locking pins —17— the spool 21, sleeve —42— and nut —44— may be readily withdrawn endwise from the case leaving the shaft section —36— on the lower case section —14— and the upper shaft section —39— on the top of the case section —15—.

The pivotal pin —56— is held against axial displacement by a projection —56'— on the spring —55'— which extends across the head of the pivot, as shown in Figures 10, 11 and 12, thus permitting the pin to be readily inserted and removed by simply springing the spring —55'— from its normal position sufficient to displace the projection —56'— from the path of the pin.

It will be observed that the line-laying arm —74— is fastened to the bottom of the nut —64— so that when the nut is in its lowermost position as shown in Figure 8, the arm —74— will be entirely away from the line when the latter is unwound from the reel in the operation of bait-casting.

The finger piece or handle —20'— also serves as a means for holding the reel against forward sliding movement on the rack —26— when the rod is whipped in the act of bait casting.

What I claim is:

1. In a reel attachment for fish rods, the combination with a guide, a reel-containing case reciprocally movable along the guide, a reel and a drive-shaft therefor both rotatably mounted in the case, of means including a centrifugally operated pawl actuated by the relative movement of the guide and case for rotating the drive-shaft.

2. In a reel-attachment for fish rods, the combination with a guide, a reel-containing case reciprocally movable along the guide, a reel and a drive-shaft therefor both rotatably mounted in the case, of means including a pair of centrifugally operated pawls alternately actuated by reverse movements of the case along the guides for rotating the drive shaft in one and the same direction.

3. In a reel-attachment for fish rods, the combination with a guide, a reel-containing case reciprocally movable along the guide, a reel and a drive-shaft therefor both rotatably mounted in the case, of a rotary member actuated by the guide as the case is reciprocated along said guide, a rotary ratchet wheel, a pivoted pawl carried by said rotary member and actuated by centrifugal force to engage and rotate the ratchet wheel, and means for transmitting motion from the ratchet wheel to the drive shaft.

4. In a reel attachment for fish rods, a guide extending lengthwise of the rod, means for holding the guide on the rod, a reel case movable in reverse directions lengthwise of and upon the guide, a reel rotatably mounted within the case, connections between the reel and guide for rotating the reel as the case is moved in reverse directions along the guide and a protective shield for the guide attached to the reel-case to move therewith.

5. In a reel attachment for fish rods, a guide extending lengthwise of the rod and having one end slidably connected to the rod to permit the guide to be moved lengthwise thereof, said guide having its other end provided with a lengthwise slot, and a locking pin journaled on the rod and provided with a T-head movable to one position crosswise of the slot for locking the guide against endwise movement and also movable to a position lengthwise of the slot to permit the removal of the adjacent end of the guide from the rod and thereby to allow the guide to be moved endwise of the rod, in combination with a reel-supporting case slidable in reverse directions lengthwise of and upon the guide, a reel rotatably mounted within the case and cooperative means between the guide and reel for rotating the reel in one and the same direction as the case is moved in opposite directions along the guide.

6. In a reel attachment for fish rods, a guide extending along the rod, a reel case reciprocally movable lengthwise of and upon the guide, a reel rotatably mounted in the case, means for transmitting motion from the guide to the reel as the case is reciprocated along the guide, a shield slidable along and upon the guide, and a manually operable detent for locking and releasing the shield to and from the reel case.

7. A reel attachment for fish rods comprising a reel-supporting case, a line reel rotatably mounted within the case, a line-laying device adjacent the reel case, a housing for the line-laying device, and a movable detent operable manually to one position for locking the housing to the case and to another position for releasing the housing from the case and permitting it to be detached therefrom.

8. In a reel attachment for fish rods, a reel case, a line reel rotatably mounted within the case, a plate pivoted to one of the end walls of the reel case and adjustable angularly to different positions, a brake spring actuated into engagement with the reel when the plate is adjusted to one position, means actuated by the adjustment of the plate to another position for releasing the brake, and a pivoted detent movable to one position for holding the plate against axial movement and to another position for releasing the plate for axial displacement from the adjacent end wall of the reel case.

9. In a reel attachment for fish rods, a reel case, a sleeve journaled in the case and provided with opposite end heads, a reel having a tubular hub surrounding the sleeve and held between said heads to rotate with the sleeve and to have an independent rotation relatively thereto to relieve the line from excessive strain as the latter is unwound from the reel, means for rotating the sleeve, and slip-drive connections between the hub and sleeve.

10. In a reel attachment for fish rods, a reel case, a sleeve journaled in the case and provided with opposite end heads, one of which is adjustable toward and from the other, a reel having a tubular hub surrounding the sleeve and held between said heads to rotate with the sleeve and to have an independent rotation relatively thereto to relieve the line from excessive strain, as the latter is unwound from the reel, means for rotating the sleeve, and a friction drive connection between the sleeve and hub.

11. In a reel attachment for fish rods, a guide extending lengthwise of the rod, a reel case reciprocally slidable along and upon the guide, a reel rotatably mounted within the case, said guide having teeth along its opposite longitudinal edges, gears mounted within the case at opposite sides of the guide and meshing with the adjacent teeth of the guide to rotate as the reel-case is moved along the guide, additional gears co-axial with the first-named gears and provided with internal ratchet teeth, pawls on the first-named gears adapted to be operated by centrifugal force for engaging the ratchet teeth of the adjacent second-named gears and rotating the latter, and means for transmitting rotary motion from the second-named gears to the reel.

12. In a reel attachment for fish rods, a guide extending lengthwise of the rod and provided with teeth along its opposite longitudinal edges, a reel case reciprocally slidable along and upon the guide and provided with a reel chamber and an underlying gear chamber, studs projecting upwardly from the bottom of the gear chamber at opposite sides of the guide, a partition plate removably mounted upon the upper ends of the studs between the gear chamber and reel chamber, detents operable at will to one position for locking the partition plate to the studs and to another position for releasing said plate, gears journaled on said studs and meshing with adjacent teeth of the guide, a reel rotatably mounted within the reel chamber, and means for transmitting rotary motion from said gears to the reel as the case is reciprocated along the guide.

13. In a reel attachment for fish rods, a guide extending lengthwise of the rod and provided with teeth along its opposite longitudinal edges, a reel case reciprocally slidable along and upon the guide and provided with a reel chamber and an underlying gear chamber, studs projecting upwardly from the bottom of the gear chamber at opposite sides of the guide, a partition plate removably mounted upon the upper ends of the studs between the gear chamber and reel chamber, detents operable at will to one position for locking the partition plate to the studs and to another position for releasing said plate, gears journaled on said studs and meshing with adjacent teeth of the guide, additional gears rotatably mounted on the studs and provided with ratchet teeth, pawls pivoted to the first-named gears and operable by centrifugal force to engage the adjacent ratchet wheels for transmitting rotary motion from the first-named gears to the second-named gears, a reel rotatably mounted within the reel chamber, and means for transmitting rotary motion from the second-named gears to the reel.

In witness whereof I have hereunto set my hand this second day of August 1927.

JOHN ASA RICKETTS.